(12) United States Patent
Bauer, Jr.

(10) Patent No.: US 7,832,608 B1
(45) Date of Patent: Nov. 16, 2010

(54) UNIVERSAL HITCH-MOUNTED BASKET

(76) Inventor: Frederick R. Bauer, Jr., N8723 Hanson Dr., Holmen, WI (US) 54636

( * ) Notice: Subject to any disclaimer, the term of this patent is extended or adjusted under 35 U.S.C. 154(b) by 1159 days.

(21) Appl. No.: 11/486,548

(22) Filed: Jul. 14, 2006

(51) Int. Cl.
*B60R 11/00* (2006.01)

(52) U.S. Cl. ............... 224/526; 224/499; 224/519; 224/521

(58) Field of Classification Search ......... 224/519–521, 224/525, 526, 523, 531, 509, 405, 524, 528, 224/503; 280/504
See application file for complete search history.

(56) References Cited

U.S. PATENT DOCUMENTS

| | | | |
|---|---|---|---|
| 3,623,747 A * | 11/1971 | Humlong | .................... 280/202 |
| 4,280,713 A | 7/1981 | Bruhn | |
| 4,640,658 A | 2/1987 | Webb, Jr. | |
| 4,813,584 A | 3/1989 | Wiley | |
| 4,906,015 A | 3/1990 | LaCroix et al. | |
| 4,915,276 A * | 4/1990 | Devito | ........................ 224/521 |
| 4,938,399 A | 7/1990 | Hull et al. | |
| 5,038,983 A | 8/1991 | Tomososki | |
| 5,094,373 A | 3/1992 | Lovci | |
| 5,106,002 A | 4/1992 | Smith et al. | |
| 5,232,135 A | 8/1993 | Marren | |
| 5,294,027 A * | 3/1994 | Plastina | ...................... 224/553 |
| 5,427,289 A | 6/1995 | Ostor | |
| 5,449,101 A | 9/1995 | Van Dusen | |
| 5,476,279 A | 12/1995 | Klemetsen | |
| 5,497,927 A | 3/1996 | Peterson | |
| 5,560,630 A | 10/1996 | Phares et al. | |
| 5,593,139 A | 1/1997 | Julian | |
| 5,649,656 A | 7/1997 | Davy | |
| 5,752,639 A | 5/1998 | Rice | |
| 5,775,560 A | 7/1998 | Zahn et al. | |
| 5,850,959 A | 12/1998 | Miller | |
| 5,853,278 A | 12/1998 | Frantz | |
| 5,950,890 A | 9/1999 | Darby | |
| 6,000,594 A | 12/1999 | Chimenti | |
| 6,006,973 A * | 12/1999 | Belinky et al. | .............. 224/510 |
| 6,007,033 A * | 12/1999 | Casson et al. | ............ 248/224.7 |
| 6,089,431 A | 7/2000 | Heyworth | |
| 6,179,184 B1 * | 1/2001 | Belinky et al. | .............. 224/510 |
| 6,202,909 B1 | 3/2001 | Belinky et al. | |
| 6,382,656 B1 | 5/2002 | Johnson, Jr. | |
| 6,390,343 B1 | 5/2002 | Jain | |
| 6,390,344 B1 | 5/2002 | Edgerly | |
| 6,409,203 B1 | 6/2002 | Williams | |
| 6,502,730 B2 | 1/2003 | Johnson | |
| 6,513,690 B1 | 2/2003 | Churchill | |
| 6,554,171 B1 * | 4/2003 | Ewing, III | .................. 224/521 |

(Continued)

*Primary Examiner*—Nathan J Newhouse
*Assistant Examiner*—Corey N Skurdal
(74) *Attorney, Agent, or Firm*—Robert J. Harter (57) ABSTRACT

A cargo carrier mountable to a hitch receiver of a vehicle includes a lightweight, open-air wire basket supported by a tough metal bracket. The bracket is reversible so that the carrier can be attached to different size hitch receivers. To simplify assembly, the mounting hardware for attaching the basket to the bracket is the same regardless of which size receiver is being used. The holes for the mounting hardware are positioned such that the fasteners can avoid carrying most of the cargo's weight. If the basket is evenly loaded with cargo, it is possible for the fasteners to carry substantially no weight whatsoever. When not in use, the basket is collapsible to lie generally flat against the bracket so that the cargo carrier can be readily stowed.

7 Claims, 6 Drawing Sheets

U.S. PATENT DOCUMENTS

| | | |
|---|---|---|
| 6,588,636 B1 | 7/2003 | Young et al. |
| 6,604,658 B1 | 8/2003 | Young et al. |
| 6,712,248 B2 | 3/2004 | Mitchell |
| 6,783,315 B1 | 8/2004 | Senechal |
| 6,846,017 B2 | 1/2005 | Martin |
| 6,874,804 B2 | 4/2005 | Reese et al. |

* cited by examiner

UNIVERSAL HITCH-MOUNTED BASKET

BACKGROUND OF THE INVENTION

1. Field of the Invention

The subject invention generally pertains to vehicle-mounted cargo carriers and more particularly to one that can be mounted to the hitch receiver of the vehicle.

2. Description of Related Art

To rig a vehicle for pulling a trailer, the vehicle can be provided with a standard hitch receiver into which a drawbar can be inserted and pinned in place. The drawbar includes a hitch ball upon which a ball-receiving coupler of the trailer can be set, thereby coupling the trailer to the vehicle. Although hitch receivers can be of almost any imaginable shape and size, they are typically a square tube with a 1.25-inch or 2-inch square opening that can receive a similar sized square shank of a drawbar.

Hitch receivers can also be used for supporting an outboard cargo carrier as disclosed in U.S. Pat. Nos. 4,813,584; 5,038,983; 6,513,690 and 6,712,248. In these examples, various brackets are used for coupling the cargo carrier to a hitch receiver. Such brackets, however, might not connect to different size receivers without significant modification or replacement of certain parts.

One bracket, disclosed in U.S. Pat. No. 6,604,658, is perhaps the most versatile in that the bracket can be reversed to fit either a 1.25-inch or 2-inch receiver. With that design, however, a different set of mounting hardware is used depending on which end of the bracket is inserted into the receiver. Bushings (16) of the '658 patent, for instance, are used with a 2-inch receiver but not a 1.25-inch receiver. If the unused bushings are misplaced while the bracket is inserted in a 1.25-inch receiver, it might be difficult to later switch over to a 2-inch receiver. Or, if the bracket is only used with a 1.25-inch receiver, the bushings can add unnecessary cost to the unit. Moreover, fastener (50) and pin (54) of the '658 patent are relied upon as actual weight-bearing members rather than used for just holding the other more structural members of the unit together.

Consequently, a need exists for a simple, robust cargo carrier that can be readily supported by different size receivers.

SUMMARY OF THE INVENTION

It is an object of the invention to provide a cargo carrier that can be supported by various size hitch receivers.

Another object of some embodiments is to provide a cargo carrier with a wire basket that can collapse generally flat and parallel to a bracket that supports the basket so that the cargo carrier can be readily stowed by hanging the collapsed carrier against a wall.

Another object of some embodiments is to provide a cargo carrier whose load can be supported by the main structural members of the carrier rather than having to rely heavily on various fasteners to provide weight-bearing support.

Another object of some embodiments is to selectively attach a cargo carrier to either a 2-inch or 1.25-inch receiver without having to add or omit parts of the carrier.

Another object of some embodiments is to provide a cargo carrier comprising a lightweight wire basket that creates minimal wind resistance and to provide a mounting plate that solidly supports the weight of the basket.

Another object of some embodiments is to provide a bracket that elevates a cargo carrier well above a hitch receiver regardless of which end of the bracket is inserted in the receiver.

Another object of some embodiments is to provide a cargo carrier with a reversible bracket that includes a large end and a small end for selectively fitting a large receiver or a small receiver respectively, wherein the bracket's cross-sectional area along most of its length is similar to the bracket's small end (rather than its large end) to minimize the bracket's overall size and weight.

One or more of these and/or other objects of the invention are provided a cargo carrier that includes a bracket that can selectively fit different size receivers and do so without having to add or omit parts of the cargo carrier.

DESCRIPTION OF THE PREFERRED EMBODIMENT

A cargo carrier 10, shown in FIGS. 1, 2, 4, 6-8, 11 and 20-23 can be reconfigured to mount to at least two different size receivers of a vehicle 12. Although receivers can be of almost any size and shape, carrier 10 will be described, for sake of example, as being selectively mountable to either a receiver 14 (FIGS. 11 and 12) having a substantially 1.25-inch square opening 16 or a larger receiver 18 (FIGS. 1, 2 and 6-9) having a substantially 2-inch square opening 20 (1.25 and 2 are nominal values, and their exact dimensions may vary).

In a currently preferred embodiment, cargo carrier 10 includes a wire basket 22 comprising a bottom screen 24, two side screens 26, and two end screens 28. Screens 24, 26, and 28 are each primarily constructed of a network of substantially round wires 30. A spiral wire binder 32 (FIGS. 7, 8 and 22) pivotally attaches the lower edge of each side screen 26 to bottom screen 24. To attach end screens 28 and to provide basket 22 with structural support, narrow rods 34 (FIGS. 8 and 21) extending downward from end screens 28 are inserted into sleeves 36, which are welded to side screens 26. A wire clip 38 can be used to help hold end screens 28 in position relative to bottom screen 24. The assembled basket 22 is a box-like structure that is open at the top for loading and removing cargo.

Figure 5:
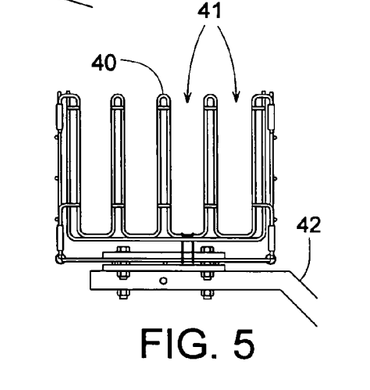
FIG. 5 is similar to FIG. 4 but showing an alternate end screen.
Figure 6:
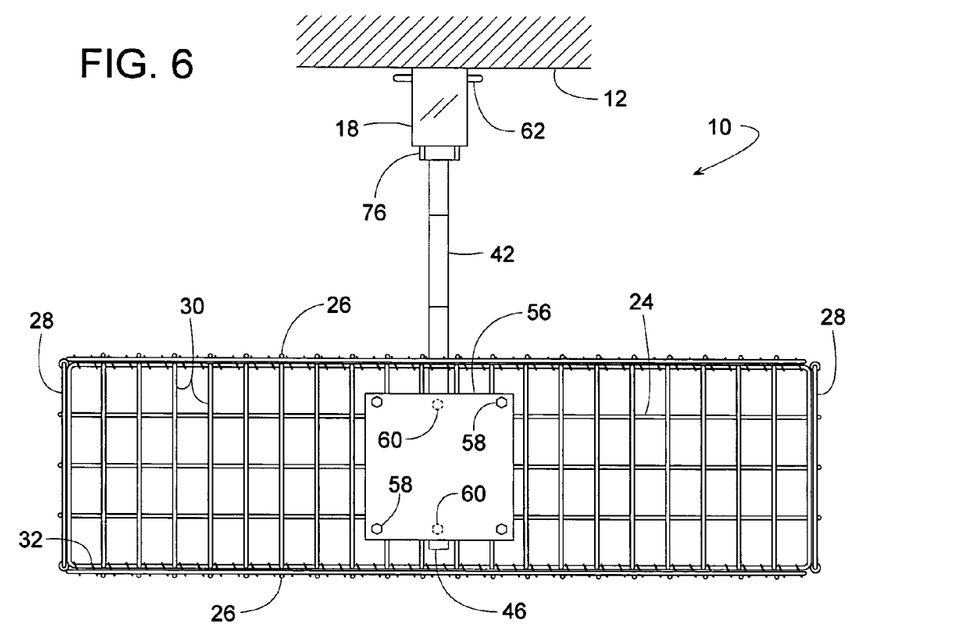
FIG. 6 is a top view of the cargo carrier of FIG. 1.
Figure 7:
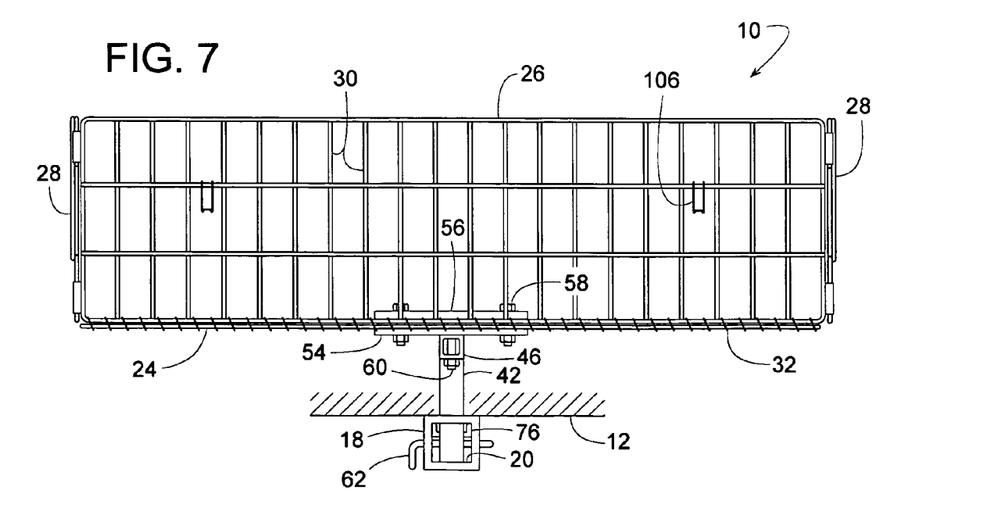
FIG. 7 is a rear view of the cargo carrier of FIG. 1.

The actual construction of basket 22 may vary. FIG. 5, for instance, shows an alternate end screen 40 that includes slots 41 for holding horizontally elongate items such as ski equipment, fishing rods, pipe, lumber, etc.

Figure 1:
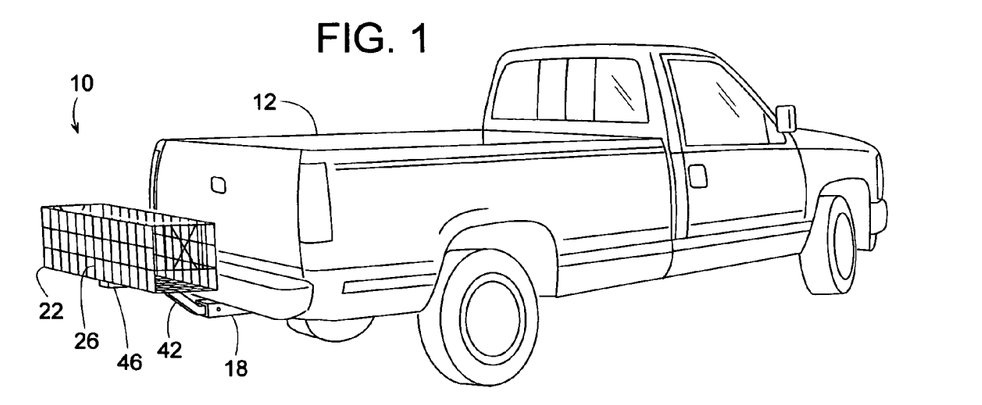
FIG. 1 is a rear perspective view of a vehicle with novel cargo carrier.
Figure 2:
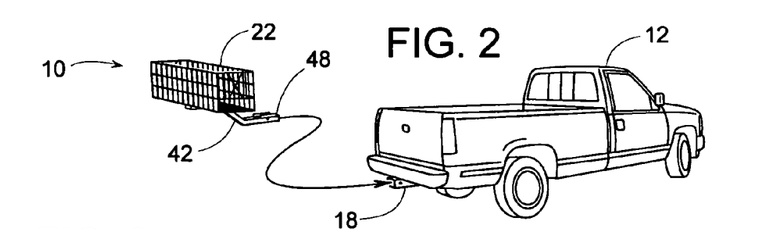
FIG. 2 is a rear perspective view showing a bracket of the cargo carrier being inserted into a hitch receiver of the vehicle.
Figure 3:
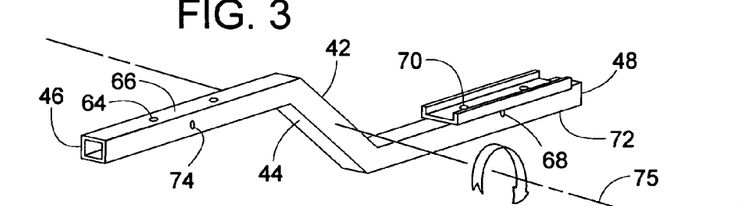
FIG. 3 is a perspective view of the cargo carrier's bracket.
Figure 4:
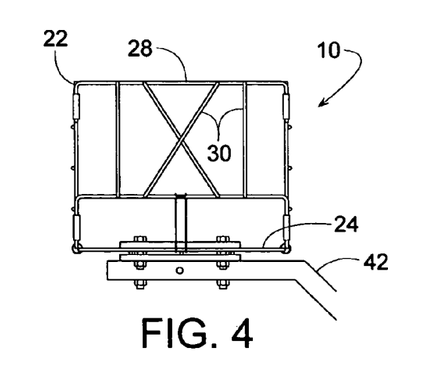
FIG. 4 is a partial end view of the cargo carrier of FIGS. 1 and 2.
Figures 8, 9, 10:
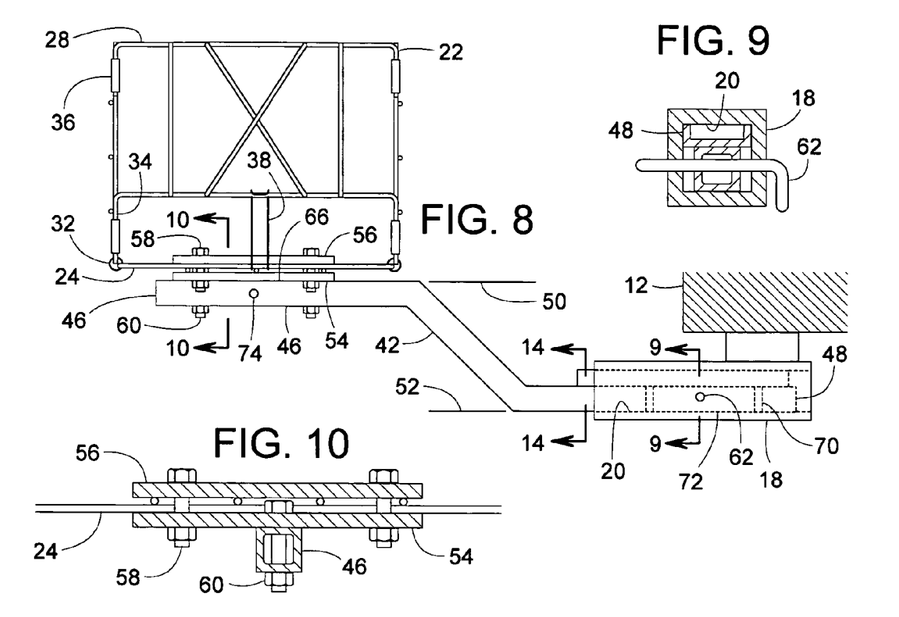
FIG. 8 is an end view of the cargo carrier of FIG. 1.
FIG. 9 is a cross-sectional view taken along line 9-9 of FIG. 8.
FIG. 10 is a cross-sectional view taken along line 10-10 of FIG. 8.

Referring further to FIG. 3, a reversible bracket 42 for supporting basket 22 comprises a nominal 1.25-inch square tube 44 that includes a relatively small end 46 adapted to fit within the 1.25-inch receiver 14 and a relatively large end 48 for the 2-inch receiver 18. Referring to FIG. 8, tube 44 is formed such that ends 46 and 48 lay along two spaced-apart lines 50 and 52 that are substantially parallel to each other. While one end 46 or 48 is inserted into receiver 14 or 18, the other end of bracket 42 is attached to the bottom of basket 22. A mounting plate 54, a backup plate 56, and basket fasteners 58 and 60 help fasten bottom screen 24 to bracket 42. A hitch fastener 62, such as a common hitch pin, can help hold the opposite end 46 or 48 of bracket 42 within receiver 14 or 18.

When cargo carrier 10 is mounted to the 2-inch receiver 18, as shown in FIGS. 1 and 6-10, basket fasteners 60 extend through one or more generally vertical holes 64 (first generally vertical hole) in small end 46 to clamp mounting plate 54 to a first weight bearing surface 66 of end 46, and basket fastener 58 clamps bottom screen 24 between plates 54 and 56, thereby fastening basket 22 to small end 46 of bracket 42. Any number of holes and corresponding fasteners 58 and 60 can be used. Meanwhile, hitch fastener 62 extends through a generally horizontal hole 68 (second generally horizontal hole) in large end 48 and also extends through a generally aligned hole in the 2-inch receiver 18, thereby fastening large end 48 of bracket 42 to receiver 18.

Figures 11, 12, 13:
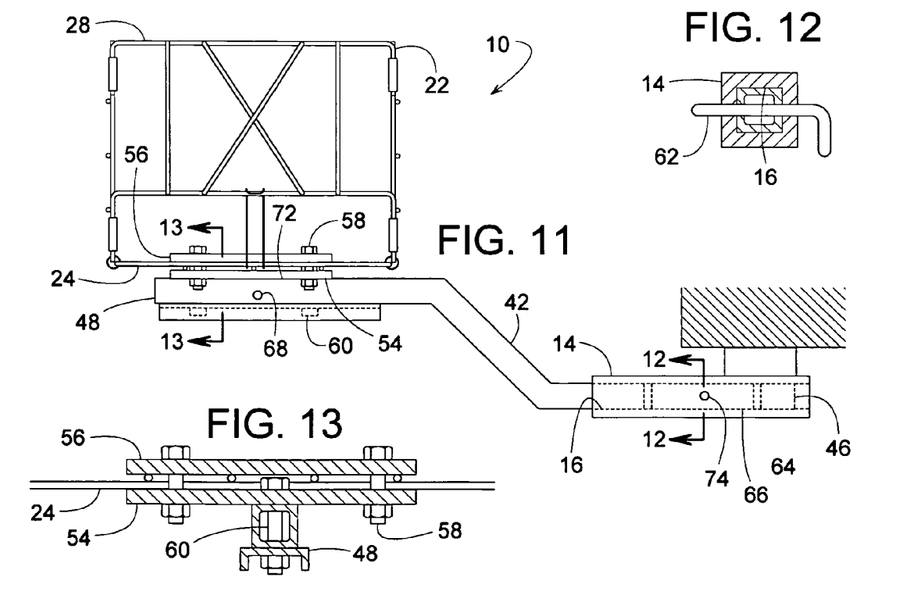
FIG. 11 is an end view similar to FIG. 8 but showing the bracket inserted into a smaller hitch receiver.
FIG. 12 is a cross-sectional view taken along line 12-12 of FIG. 11.
FIG. 13 is a cross-sectional view taken along line 13-13 of FIG. 11.

When cargo carrier 10 is mounted to the 1.25-inch receiver 14, as shown in FIGS. 11-13, basket fasteners 60 extend through one or more generally vertical holes 70 (second generally vertical hole) in large end 48 to clamp mounting plate 54 to a second weight bearing surface 72 of end 48, and basket fastener 58 clamps bottom screen 24 between plates 54 and 56, thereby fastening basket 22 to large end 48 of bracket 42. Again, any number of holes and corresponding fasteners 58 and 60 can be used. At the other end of bracket 42, hitch fastener 62 extends through a generally horizontal hole 74 (first generally horizontal hole) in small end 46 and also extends through a generally aligned hole in the 1.25-inch receiver 14, thereby fastening small end 46 of bracket 42 to receiver 14.

Switching bracket 42 between the positions of FIGS. 8 and 11 involves rotating bracket 42 180 degrees about a horizontal axis 75, as shown in FIG. 3. In either position, weight bearing surfaces 66 and 72 each face vertically but in opposite directions (upward or downward). It should also be noted that regardless of whether bracket 42 is in the 1.25-inch position of FIG. 11 or in the 2-inch position of FIG. 8, cargo carrier 10 uses the same set of hardware (plate 54, plate 56 and fasteners 58 and 60) for fastening basket 22 to bracket 42. Moreover, the weight of basket 22 and its cargo is primarily carried by main structural members (e.g., mounting plate 54 and bracket 42), and fasteners 58 and 60 are primarily used for just holding the main structural members together.

There are infinite ways of providing a bracket with a large end that can fit snugly into a nominal 2-inch square opening of a receiver. Some of the better examples include, but are not limited to, the designs shown in FIGS. 14-23.

Figure 14:
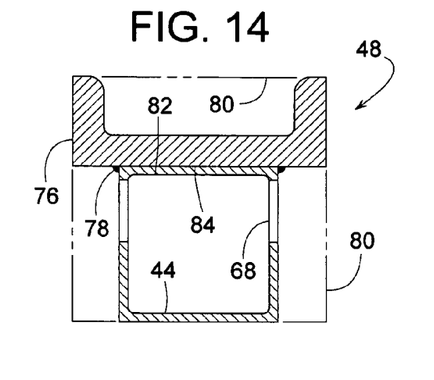
FIG. 14 is a cross-sectional view taken along line 14-14 of FIG. 8.

In FIG. 14, large end 48 is created by welding a spacer such as a ¾"×2" channel 76 to a 1.25" square tube 44. The welded structure, comprising tube 44, channel 76 and a metal weld bead 78, defines a square outer periphery 80 that can snugly fit into a nominal 2-inch opening of a receiver, wherein the term, "snugly fit" refers to a longitudinal sliding fit between two parts while the clearance between the two is sufficiently small to limit their relative rotation. Although hole 68 is shown extending only through tube 44, it would also be well within the scope of the invention to enlarge the hole's diameter or raise the hole's position such that hole 68 breaks through an upper surface 82 of tube 44 and cuts into a lower surface 84 of spacer 76.

Figure 15:
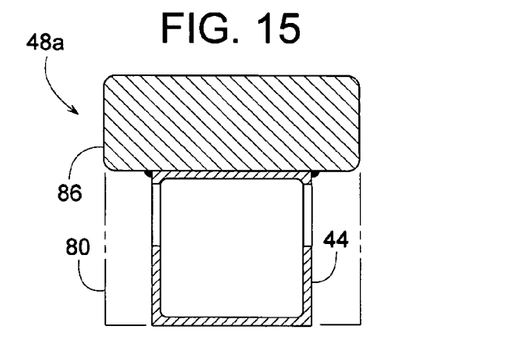
FIG. 15 is a cross-sectional view similar to FIG. 14 but showing a second embodiment.

In FIG. 15, a nominal 2-inch large end 48a is created by welding ¾"×2" spacer 86 to a 1.25-inch square tube 44.

Figure 16:
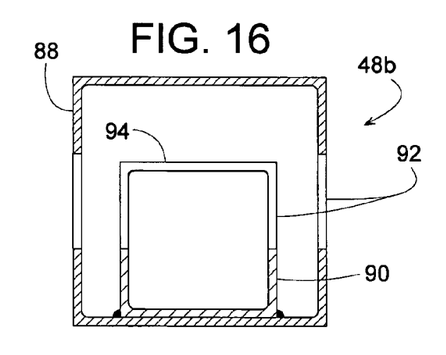
FIG. 16 is a cross-sectional view similar to FIG. 14 but showing a third embodiment.

In FIG. 16, a nominal 2-inch large end 48b is created by welding a 1.25-inch square tube 90 inside a 2-inch square tube spacer 88. In this example, a hole 92 for a hitch pin breaks through an upper surface 94 of tube 90. As an alternative to breaking through upper surface 94, tube 90 can be inserted just short of hole 92 so that the hitch pin lies just beyond the end of tube 90 rather than passing through it (similar to FIGS. 20 and 21).

Figure 17:
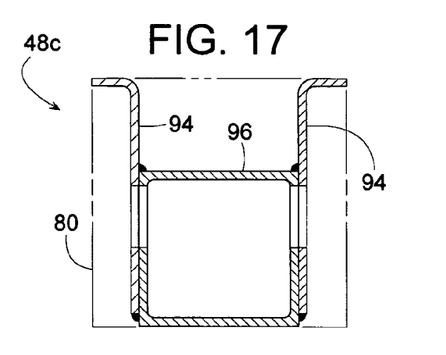
FIG. 17 is a cross-sectional view similar to FIG. 14 but showing a fourth embodiment.

In FIG. 17, a nominal 2-inch large end 48c is created by welding two L-shaped spacers 94 to a 1.25-inch square tube 96.

Figure 18:
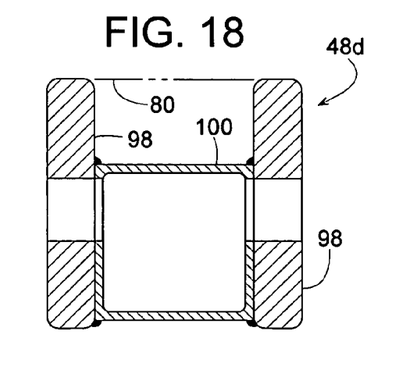
FIG. 18 is a cross-sectional view similar to FIG. 14 but showing a fifth embodiment.

In FIG. 18, a nominal 2-inch large end 48d is created by welding two ⅜-inch spacers 98 to the lateral sides of a 1.25-inch square tube 100.

Figure 19:
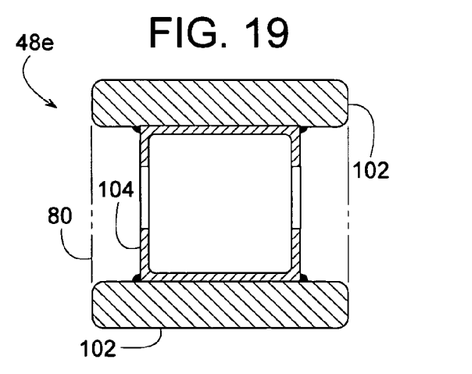
FIG. 19 is a cross-sectional view similar to FIG. 14 but showing a sixth embodiment.

In FIG. 19, a nominal 2-inch large end 48e is created by welding two ⅜-inch spacers 102 to the upper and lower sides of a 1.25-inch square tube 104.

Figures 20, 21:
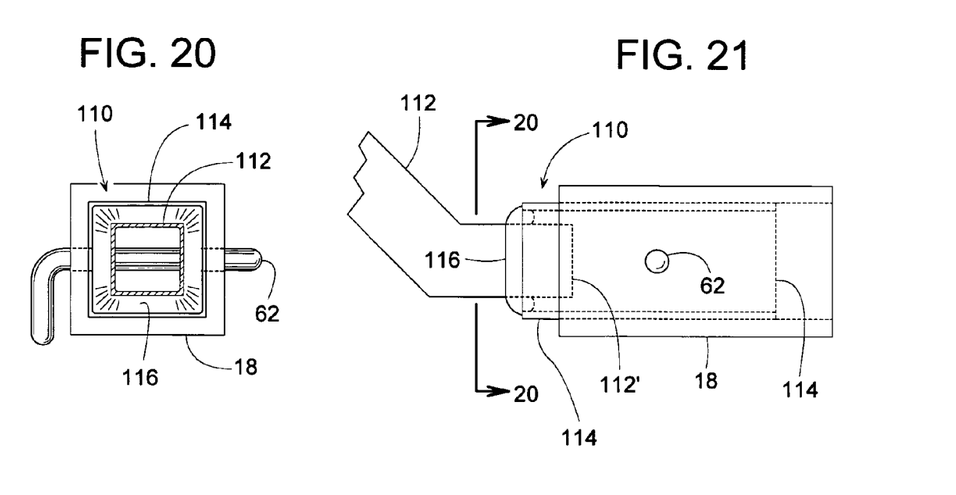
FIG. 20 is a cross-sectional view taken along line 20-20 of FIG. 21
FIG. 21 is a side view of the large end of a bracket inserted in a large receiver.

For the embodiment shown in FIGS. 20 and 21, a nominal 2-inch large end 110 is created by welding a 1.25-inch square tube 112 centrally within a 2-inch square tube spacer 114. A metal weld bead 116 extends completely or partially around tube 112. In this example, tube 112 is inserted just short of the hitch pin hole so that hitch pin 62 lies just beyond an end 112' of tube 112 rather than passing through tube 112.

Figures 22, 23:
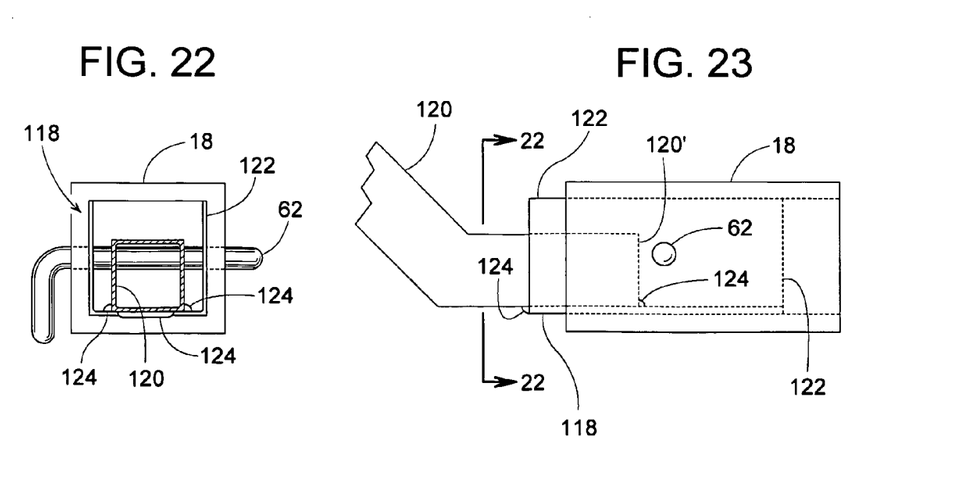
FIG. 22 is a cross-sectional view taken along line 22-22 of FIG. 23.
FIG. 23 is a side view of the large end of a bracket inserted into a large receiver according to another embodiment.

Alternatively, a nominal 2-inch large end 118 can be created by welding a 1.25-inch square tube 120 to a bottom or any other surface of a 2-inch square channel spacer 122. One or more weld beads 124 can be applied at one or both ends and/or along the length of tube 120. In this example, tube 120 is inserted just short of the hitch pin hole so that hitch pin 62 lies just beyond an end 120' of tube 120.

Figure 24:
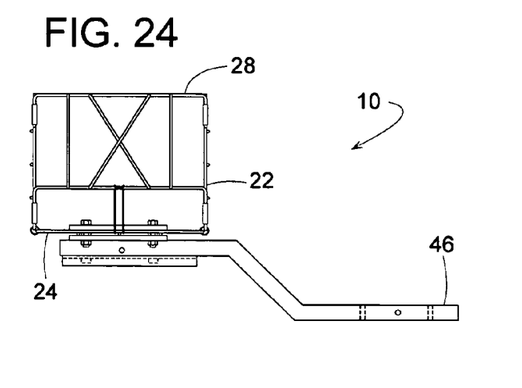
FIG. 24 is an end view similar to FIG. 11 but showing the cargo carrier removed from the vehicle.
Figure 25:
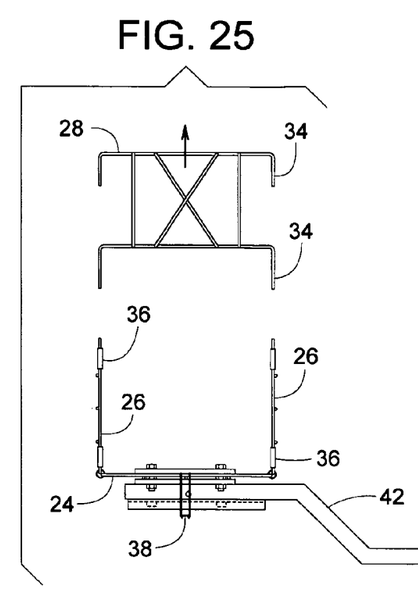
FIG. 25 is an end view similar to FIG. 24 but showing the end screens being removed from the rest of the basket.
Figures 26, 27:
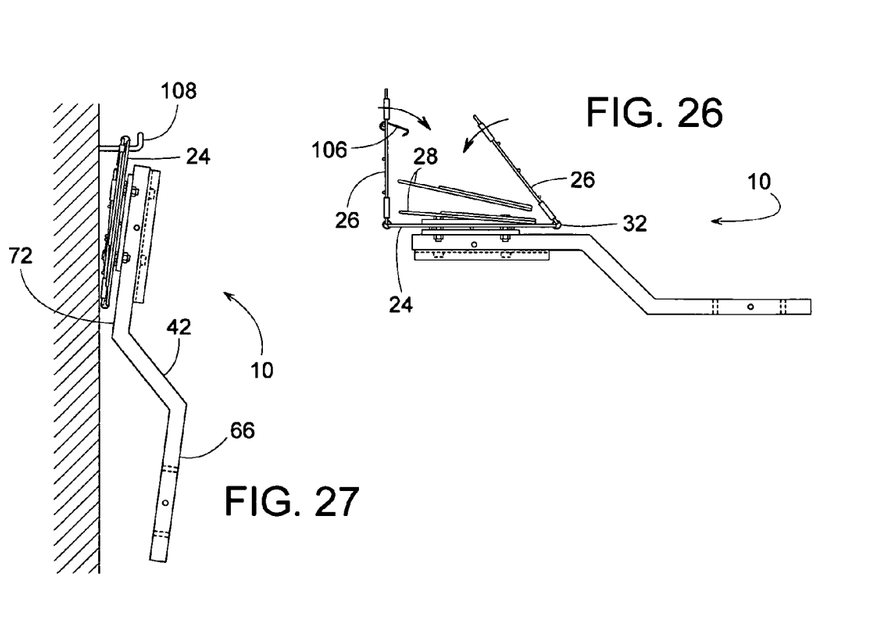
FIG. 26 is an end view showing the basket being collapsed in a generally flat configuration.
FIG. 27 is an end view showing the collapsed basket being hung on a wall-mounted hook.

FIGS. 24-27 show how cargo carrier 10 can be partially disassembled and collapsed to a relatively flat configuration that makes carrier 10 easy to stow. FIG. 24 shows carrier 10 separated from receiver 14. FIG. 25 shows end screens 28 being removed after disengaging clips 38. FIG. 26 shows side screens 26 pivoting downward and end screens 28 being tucked between bottom screen 24 and side screens 26. A clip 106 on one of the side screens can be latched onto bottom screen 24 to hold basket 22 in the relatively flat configuration of FIG. 27 such that screens 24, 26 and 28 are generally parallel to weight bearing surfaces 66 and 72. Once in the generally flat configuration, cargo carrier 10 can be readily hung on a wall-mounted hook 108.

Although the invention is described with reference to a preferred embodiment, it should be appreciated by those of ordinary skill in the art that various modifications are well within the scope of the invention. The scope of the invention, therefore, is to be determined by reference to the following claims.

The invention claimed is:

1. A cargo carrier mountable to a hitch receiver of a vehicle, wherein the hitch receiver could be one of a first size and a second size, the cargo carrier comprising:
   a bracket being selectively positionable to a first position and a second position,
   a relatively small end and a relatively large end at opposite ends of the bracket, wherein the relatively small end has a first outer periphery defining a nominal 1.25-inch square, and the relatively large end has a second outer periphery defining a nominal 2-inch square such that the relatively small end is adapted to snugly fit within the hitch receiver of the first size when the bracket is in the first position, and the relatively large end is adapted to snugly fit within the hitch receiver of the second size when the bracket is in the second position;
   a first weight-bearing surface disposed on the relatively small end;
   a second weight-bearing surface disposed on the relatively large end and being substantially parallel with and offset to the first weight bearing surface, wherein the first weight-bearing surface and the second-weight bearing surface face in substantially opposite directions of each other such that:
   a) when the relatively small end is disposed within the hitch receiver, the first weight-bearing surface faces generally downward and the second weight bearing surface faces generally upward; and
   b) when the relatively large end is disposed within the hitch receiver, the first weight-bearing surface faces generally upward, and the second weight-bearing surface faces generally downward;
   a mounting plate being selectively mountable to the relatively small end and the relatively large end;
   a wire basket attached to the mounting plate such that the mounting plate is underneath the wire basket, the wire basket being situated over and supported by the first weight-bearing surface when the bracket is in the second position, the wire basket being situated over and supported by the second weight-bearing surface when the bracket is in the first position, the wire basket comprising two side screens, two end screens, and a bottom screen, the wire basket being selectively configured in a first configuration and a second configuration, such that:
   a) in the first configuration, the two side screens, the two end screens and the bottom screen are in an orthogonal arrangement that places the wire basket in a box-like shape,
   b) in the second configuration, the two end screens are sandwiched in a generally flat arrangement between the bottom screen and the two side screens such that the bottom screen, the two side screens and the two end screens all lie substantially flat and substantially parallel to each other; and
   a hitch fastener and a basket fastener, wherein the relatively small end defines a first generally horizontal hole and a first generally vertical hole, and the relatively large end defines a second generally horizontal hole and a second generally vertical hole, the first generally horizontal hole is substantially parallel to the second generally horizontal hole, and the first generally vertical hole is substantially parallel to the second generally vertical hole, such that:
   a) when the bracket is in the first position, the hitch fastener extends through the first generally horizontal hole to help fasten the bracket to the hitch receiver, the basket fastener extends through the second generally vertical hole to help fasten the basket to the bracket, the first generally vertical hole is substantially unused, and the second generally horizontal hole is substantially unused; and
   b) when the bracket is in the second position, the hitch fastener extends through the second generally horizontal hole to help fasten the bracket to the hitch receiver, the basket fastener extends through the first generally vertical hole to help fasten the basket to the bracket, the second generally vertical hole is substantially unused, and the first generally horizontal hole is substantially unused.

2. The cargo carrier of claim 1, wherein repositioning the bracket between the first position and the second position involves rotating the bracket substantially 180 degrees about a horizontal axis.

3. The cargo carrier of claim 1, wherein the entire relatively large end is higher than the relatively small end when the relatively small end is disposed within the hitch receiver, and the entire relatively small end is higher than the relatively large end when the relatively large end is disposed within the hitch receiver.

4. The cargo carrier of claim 1, further comprising a backup plate adjacent to the basket such that the basket is sandwiched between the mounting plate and the backup plate.

5. The cargo carrier of claim 1, wherein most of the basket comprises a network of substantially round wires.

6. The cargo carrier of claim 1, wherein the basket is selectively collapsible to a relatively flat configuration that lies generally parallel to the first weight-bearing surface and the second-weight bearing surface.

7. The cargo carrier of claim 1, wherein the relatively large end comprises a substantially square tube and a spacer, a metal bead integrally and permanently joins the spacer to the substantially square tube, and the substantially square tube has a cross-sectional area that is substantially equal to that of the relatively small end.

* * * * *